United States Patent
Al-Muntasheri et al.

(10) Patent No.: US 11,268,016 B2
(45) Date of Patent: *Mar. 8, 2022

(54) HIGH TEMPERATURE TREATMENT FLUIDS WITH NANO-CROSSLINKERS

(71) Applicant: Saudi Arabian Oil Company, Dhahran (SA)

(72) Inventors: Ghaithan Al-Muntasheri, Katy, TX (US); Feng Liang, Cypress, TX (US); Hooisweng Ow, Woburn, MA (US); Jason Cox, Ashland, MA (US); Martin E. Poitzsch, Northumberland, NH (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/098,050

(22) Filed: Nov. 13, 2020

(65) Prior Publication Data

US 2021/0062072 A1 Mar. 4, 2021

Related U.S. Application Data

(63) Continuation-in-part of application No. 16/914,146, filed on Jun. 26, 2020, now abandoned, which is a (Continued)

(51) Int. Cl.
*C09K 8/68* (2006.01)
*C09K 8/88* (2006.01)
(Continued)

(52) U.S. Cl.
CPC ............ *C09K 8/685* (2013.01); *C09K 8/80* (2013.01); *C09K 8/88* (2013.01); *C09K 8/882* (2013.01);
(Continued)

(58) Field of Classification Search
CPC ...... C09K 2208/10; C09K 8/80; C09K 8/685; C09K 8/805; C09K 8/62; E21B 43/267; E21B 43/26; E21B 43/25
See application file for complete search history.

(56) References Cited

U.S. PATENT DOCUMENTS

| | | |
|---|---|---|
| 5,208,216 A | 5/1993 | Williamson et al. |
| 6,011,075 A | 1/2000 | Parris et al. |

(Continued)

FOREIGN PATENT DOCUMENTS

| | | |
|---|---|---|
| WO | 2012071462 A1 | 5/2012 |
| WO | 2013158306 A1 | 10/2013 |

(Continued)

OTHER PUBLICATIONS

Barati et al., "A Review of Fracturing Fluid Systems Used For Hydraulic Fracturing of Oil and Gas Wells", Journal of Applied Polymer Science, 2014, pp. 1-11, Wiley Periodicals, Inc.
(Continued)

*Primary Examiner* — Zakiya W Bates
(74) *Attorney, Agent, or Firm* — Bracewell LLP; Constance Gall Rhebergen

(57) ABSTRACT

A treatment fluid system for reducing permeability of high permeability zones in a subterranean reservoir formation comprising a fluid composition comprising a nano-crosslinker, the nano-crosslinker comprising a nanomaterial, and a crosslinker, wherein the crosslinker comprises a chemical group selected from the group consisting of carbonyl, sulfhydryl, amine and imine, wherein the nano-crosslinker is produced by a method selected from the group consisting of pre-treating the nanomaterial with the crosslinker such that the crosslinker has been functionalized onto the nanomaterial, embedding the crosslinker on the nanoparticle, grafting the crosslinker onto the nanomaterial, and coating the crosslinker on the nanomaterial, a base polymer, and a base fluid,
(Continued)

the base fluid operable to suspend the fluid composition, wherein the base fluid comprises water, wherein the treatment fluid system is operable to reduce permeability of a high permeability zone in the subterranean reservoir formation.

19 Claims, 7 Drawing Sheets

Related U.S. Application Data continuation of application No. 16/363,247, filed on Mar. 25, 2019, now Pat. No. 10,738,236, which is a continuation of application No. 15/830,831, filed on Dec. 4, 2017, now Pat. No. 10,329,475, which is a continuation of application No. 14/963,966, filed on Dec. 9, 2015, now Pat. No. 9,862,878.

(60) Provisional application No. 62/090,635, filed on Dec. 11, 2014.

(51) Int. Cl.
*C09K 8/92* (2006.01)
*E21B 43/26* (2006.01)
*E21B 43/267* (2006.01)
*C09K 8/80* (2006.01)

(52) U.S. Cl.
CPC .............. *C09K 8/885* (2013.01); *C09K 8/887* (2013.01); *C09K 8/92* (2013.01); *E21B 43/26* (2013.01); *E21B 43/267* (2013.01); *C09K 2208/10* (2013.01)

(56) References Cited

U.S. PATENT DOCUMENTS

| | | |
|---|---|---|
| 7,644,764 B2 | 1/2010 | Berkland et al. |
| 7,721,803 B2 | 5/2010 | Huang et al. |
| 2007/0166472 A1 | 7/2007 | Jin et al. |
| 2008/0058229 A1 | 3/2008 | Berkland et al. |
| 2008/0223578 A1 | 9/2008 | Berkland et al. |
| 2009/0114390 A1 | 5/2009 | You |
| 2011/0146974 A1 | 6/2011 | Hartshorne et al. |
| 2011/0290491 A1 | 12/2011 | Gupta et al. |
| 2012/0015852 A1 | 1/2012 | Quintero et al. |
| 2012/0132422 A1 | 5/2012 | Mirakyan et al. |
| 2013/0000911 A1 | 1/2013 | Reddy et al. |
| 2013/0196883 A1 | 8/2013 | Rincon-Torres et al. |
| 2013/0233559 A1 | 9/2013 | Van Zanten et al. |
| 2014/0069644 A1 | 3/2014 | Reddy et al. |
| 2014/0144628 A1 | 5/2014 | Moradi-Araghi et al. |
| 2014/0155305 A1 | 6/2014 | Hartshorne et al. |
| 2014/0209305 A1 | 7/2014 | Lin et al. |
| 2015/0060072 A1 | 3/2015 | Busby et al. |
| 2015/0075798 A1 | 3/2015 | Tang et al. |
| 2015/0284625 A1 | 10/2015 | Silveira et al. |

FOREIGN PATENT DOCUMENTS

| | | |
|---|---|---|
| WO | 2014148917 A1 | 9/2014 |
| WO | 2015016905 A1 | 2/2015 |
| WO | 2015094279 A1 | 6/2015 |
| WO | 2015112132 A1 | 7/2015 |

OTHER PUBLICATIONS

International Search Report and Written Opinion for related PCT application PCT/US2015/065224 dated Feb. 17, 2016.
Dash et al., "Grafting of model primary amine compounds to cellulose nanowhiskers through periodate oxidation", Cellulose, 2012, pp. 2069-2079, Springer.
Funkhouser et al., "Hydraulic Fracturing Under Extreme HPHT Conditions: Successful Application of a New Synthetic Fluid in South Texas Gas Wells", SPE Deep Gas Conference and Exhibition held in Manama, Bahrain, 2010, pp. 1-8, SPE 132173.

HIGH TEMPERATURE TREATMENT FLUIDS WITH NANO-CROSSLINKERS

RELATED APPLICATION

This application claims priority from U.S. Provisional Patent Application No. 62/090,635 filed on Dec. 11, 2014 and is a continuation-in-part of U.S. patent application Ser. No. 16/914,146 filed on Jun. 26, 2020, which is a continuation of U.S. patent application Ser. No. 16/363,247 filed on Mar. 25, 2019 and issued as U.S. Pat. No. 10,738,236 on Aug. 11, 2020, which is a continuation of U.S. patent application Ser. No. 15/830,831 filed on Dec. 4, 2017 and issued as U.S. Pat. No. 10,329,475 on Jun. 25, 2019, which is a continuation of U.S. patent application Ser. No. 14/963,966 filed on Dec. 9, 2015 and issued as U.S. Pat. No. 9,862,878 on Jan. 9, 2018. For purposes of United States patent practice, this application incorporates the contents of the Provisional patent application and the Non-Provisional patent applications by reference in their entirety.

FIELD OF THE INVENTION

The invention relates to the use of high temperature treatment fluids with nano-crosslinker for treating subterranean hydrocarbon reservoir. In some embodiments, the invention relates to compositions capable of remaining in a crosslinked state for an extended period of time under high temperature and/or high pressure conditions.

BACKGROUND OF THE INVENTION

Treatment fluids can be employed in a variety of subterranean operations. Such treatment fluids can include a crosslinked-state. In some cases, a crosslinked treatment fluid can be used in a fracturing operation to transport proppant to the formation to stimulate low productivity well. In other cases, a crosslinked treatment fluid can be used to constrain the fluid flow in the subterranean reservoir formation. For example, treatment fluids can be used to temporarily divert or block the flow of fluids within at least a portion of a subterranean formation. In other uses, it can sometimes be desired to impede the flow of the formation fluids for extended periods of time by introducing a kill pill or perforation pill into the subterranean formation to cease production.

In fracturing operations or diverting applications, the treatment fluid typically needs to remain in its crosslinked-state for a short amount of time, on the scale of a few hours before the fluid is broken, that is before the crosslinked polymer network breaks. However, in some applications, the treatment fluid is used to block the flow of fluids from subterranean formations for a prolonged period of time, on the scale of days or weeks. In cases of serving as the conformation fluid to control unwanted water production in the subterranean formation in order to efficiently enhance hydrocarbon production, the function of the desired crosslinked treatment fluids will be much longer, ideally for months, years or even longer.

A main challenge of working with crosslinked treatment fluids is to control the time frame at which the crosslinked network is broken. This can prove challenging when working in formations that have intrinsically high temperature and high pressure bottom hole conditions. For formations with bottom hole temperatures around 350-450° F., traditional treatment fluids that use crosslinked polysaccharide gels, such as guar and its derivatives, are not suitable because of significant polymer breakdown in this temperature range. Treatment fluids that can work at these temperatures require thermally stable synthetic polymers such as acrylamide-based polymers.

SUMMARY OF THE INVENTION

The invention relates to the use of high temperature treatment fluids with nano-crosslinker for treating subterranean hydrocarbon reservoir. In some embodiments, the invention relates to compositions capable of remaining in a crosslinked state for an extended period of time under high temperature and/or high pressure conditions.

In a first aspect, a treatment fluid system for constraining fluid flow in a subterranean reservoir formation is provided. The treatment fluid system includes a fluid composition and a base fluid. The fluid composition includes a nano-crosslinker and a base polymer. The nano-crosslinker includes a nanomaterial and a crosslinker. The crosslinker includes a chemical group selected from the group consisting of carbonyl, sulfhydryl, amine and imine. The nano-crosslinker is produced by a method selected from the group consisting of pre-treating the nanomaterial with the crosslinker such that the crosslinker has been functionalized onto the nanomaterial, embedding the crosslinker on the nanoparticle, grafting the crosslinker onto the nanomaterial, and coating the crosslinker on the nanomaterial. The base fluid includes water and the base fluid is operable to suspend the fluid composition. The fluid composition and the base fluid are combined to produce the treatment fluid system. The treatment fluid system is operable to reduce permeability of a high permeability zone in the subterranean reservoir formation.

In certain aspects, the base polymer is operable to chemically bond to the crosslinker of the nano-crosslinker to form a network. In certain aspects, the polymer loading of the base polymer is between 30 pptg and 300 pptg. In certain aspects, the fluid composition is thermally stable up to a temperature of 450° F. In certain aspects, the nanomaterial includes a material selected from, but not limited to, the group consisting of silica, cellulose, carbon-based materials, and combinations thereof. In certain aspects, the crosslinker includes an amine-containing crosslinker. In certain aspects, the base polymer includes an acrylamide-based polymer. In certain aspects, the treatment fluid system further includes a pH control agent selected from the group consisting of potassium hydroxide, sodium hydroxide, acetic acid, potassium carbonate, sodium carbonate, potassium bicarbonate, sodium bicarbonate, hydrochloric acid and combinations thereof. In certain aspects, the treatment fluid system further includes an antioxidant selected from, but not limited to, the group consisting of phenols, polyphenols, di-tertbutyl alkyl phenols, hydroquinone, apigenin, resveratrol, ascorbic acid, tocopherol, sodium thiosulfate, sodium thiosulfate, isopropanol, methanol, ethylene glycol, thiourea, and combinations thereof. In certain aspects, the treatment fluid system further includes a clay stabilizer selected from, but not limited to, the group consisting of sodium chloride, potassium chloride, ammonia chloride, tetramethylammonium chloride (TMAC), other quaternary molecules and combinations thereof.

In a second aspect, a method for constraining fluid flow in a subterranean reservoir formation is provided. The method includes the steps of identifying a hydrocarbon producing subterranean reservoir formation and introducing an effective amount of the treatment fluid system into the hydrocarbon producing subterranean reservoir formation such that permeability is reduced.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
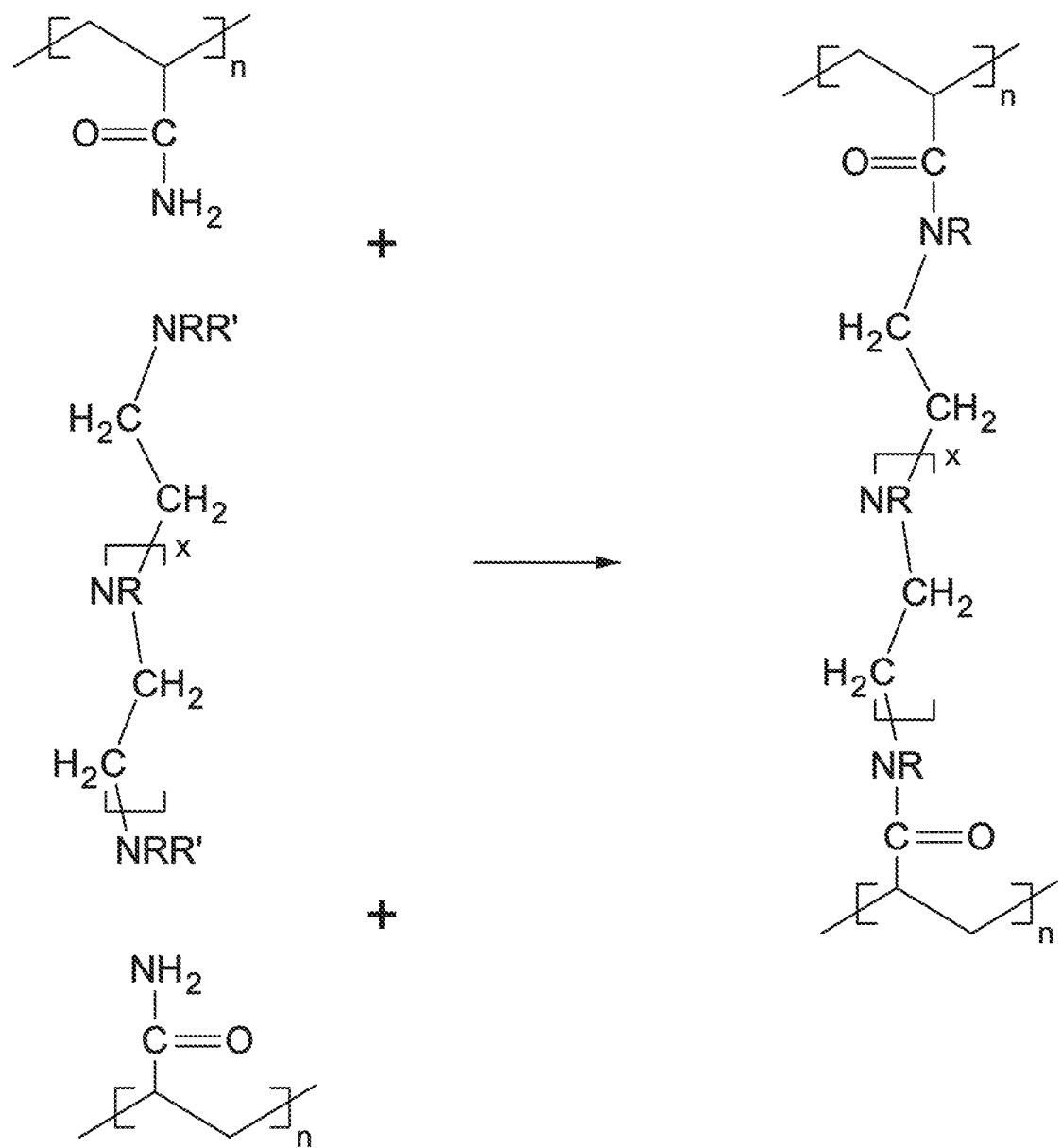
FIG. 1 shows a chemical reaction scheme between polyacrylamide (PAAM) and polyethyleneimine (PEI).

Although the following detailed description contains specific details for illustrative purposes, the skilled artisan will appreciate that many examples, variations and alterations to the following details are within the scope and spirit of the invention. Accordingly, the exemplary embodiments of the invention described herein and provided in the appended figures are set forth without any loss of generality, and without undue limitations, on the claimed invention.

As used herein, the term "nanomaterial" refers to a material defined by at least one dimensional measurement up to and including 1000 nanometers (nm), alternately less than 500 nm, alternately less than 100 nm, and alternately less than 50 nm. As used herein, nanomaterial encompasses and includes nanoparticles, nanocompounds and nanofibers. For example, a sphere shaped nanomaterial can have a diameter of up to 1000 nm. For example, a fibrous nanomaterial in the shape of cylindrical nanofiber can have a diameter of up to 1000 nm. A nanomaterial in accordance with the present invention may comprise a crystalline material, a semicrystalline material such as a semicrystalline polymer, an amorphous solid and combinations thereof. In some embodiments, the nanoparticle is exclusively a crystalline material. In addition, a nanoparticle for use in the present invention may assume any number of geometric shapes, including but not limited to spheres, plates, rods and discs as well as Platonic solids such as cubes, tetrahedra, octahedra, dodecahedra and icosahedra. The use of a particular shape or geometry for a nanoparticle of the present embodiments may derive from a desired or expected property associated with the shape or geometry. For example, compositions comprising rod shaped nanoparticles in accordance with the present invention are expected to exhibit a greater relative viscosity as compared to compositions comprising spherical nanoparticles. A fiber is considered to have a rod shape for the purposes of this invention. As used herein, "rod" refers to a cylindrical shape having a diameter and a height. Nanomaterials for use in the present invention can be commercially obtained or can be synthesized as part of the process. It will be understood by one of skill in the art that the nanomaterials are not suitable for use as proppants. Without being bound to a particular theory, it is understood that proppants require certain mechanical properties, such as, for example, crush strength.

As used herein, a "crosslinker" refers to a compound capable of chemically bonding to and thereby connecting ("crosslinking") two or more individual polymers. In certain embodiments, the crosslinker may form one or more covalent bonds with the polymers. A crosslinker, in accordance with the present invention, may bond to a polymer via a carbonyl, sulfhydryl, amine or imine chemical group on the crosslinker. A crosslinker for use in the present invention is not limited to any particular spacial arrangement and may, in certain embodiments, assume one or more of a linear, branched or dendrimeric structure prior to or following bonding to two or more individual polymers.

As used herein, a "nano-crosslinker" refers to a nanomaterial capable of chemically bonding to and thereby connecting ("crosslinking") two or more individual polymers. The nano-crosslinker can be created by surface modification of a nanomaterial with a crosslinker. The nano-crosslinker can be produced by pre-treating the nanoparticle with the crosslinker, whereby the crosslinker has been functionalized onto the nanoparticle. The nano-crosslinker can be a nanoparticle embedded with a crosslinker. The nano-crosslinker can be prepared by grafting a crosslinker onto a nanomaterial. In certain embodiments, the crosslinker forms a coating on the nanomaterial. Advantageously, grafting the crosslinker onto the nanomaterials extends the length of the crosslinker in ways such that inter-crosslinking may be favored over intracrosslinking when using a larger crosslinker. Inter-crosslinking or intermolecular bonds are bonds which exist between two different molecules. In the present invention, inter-crosslinking is favored because increased inter-crosslinking increases the network between the base polymer molecules and the increased network increases the viscosity. In the treatment fluid system, the amount of crosslinker used is less than the base polymer so it can be more cost effective to coat the crosslinker onto the nanomaterials instead of the base polymers onto the nanomaterials. In embodiments where the nano-crosslinker includes an amine-containing crosslinker, the nano-crosslinker can be prepared by interacting amine-containing molecules and the nanomaterials through ionic interactions, non-covalent bonding, or covalent bonding. It will be understood by one of skill in the art that the nano-crosslinkers of the treatment fluid system are not suitable for use as proppants in the treatment fluid system.

As used herein, the term "nanowhisker" refers to a filamentous crystalline nanoparticle formed, for example, via acid hydrolysis, vapor-liquid-solid (VLS) growth, molecular beam epitaxy or interfacial precipitation. In non-limiting embodiments, a nanowhisker can comprise a carbohydrate including but not limited to cellulose, a metal oxide, or a carbon allotrope including but not limited to fullerene.

As used herein, "fluid composition" refers to a composition that is incorporated into a fracturing fluid for use in stimulating production in a subterranean reservoir formation according to the present invention. The fluid composition is composed of a nano-crosslinker and a base polymer.

The present invention addresses problems associated with constraining fluid flow in a subterranean reservoir. Embodiments of the treatment fluid system described herein advantageously reduce the fluid flow of a subterranean reservoir through fluid loss and conformance control applications. Embodiments of the treatment fluid system can include use as a diversion material, kill pill, perforation pill, or conformation control fluid.

The compositions and methods provided herein solve several problems that are frequently encountered during the operation of subterranean reservoir formations, including fractures within the formations, where high temperature and pressure conditions are encountered.

In certain embodiments, the compositions and methods described herein advantageously and unexpectedly mitigate formation damage that can be caused, for example, by a traditional fracturing gel, water blockage, and/or condensate banking. The formation damage caused by these conditions results in reduced permeability of fluids within the formation, and subsequently leads to poor production of a well.

Advantageously, the treatment fluid systems and methods described here can constrain fluid flow for extended periods of time. Extended periods of time can include days, weeks, months, or years.

The present invention provides for methods and compositions capable of stimulating hydrocarbon production in subterranean formations.

The present invention includes the treatment fluid system for increasing hydrocarbon production in a subterranean reservoir formation. The treatment fluid system is produced by introducing the fluid composition to a base fluid and mixing the two components together. The treatment fluid system for use with the present invention can be designed based on its physicochemical properties, included but not limited to viscosity, rheology, miscibility and thermal stability. The treatment fluid system can reduce the damage in the subterranean reservoir formation. The treatment fluid system is thermally stable (exhibits fluid stability) at temperatures between about 300° F. (148° C.) and about 450° F. (232° C.) and alternately at temperatures between about 350° F. (176° C.) and 400° F. (204° C.). In preferred embodiments, the treatment fluid system is thermally stable up to a temperature of about 400° F. (204° C.). In certain embodiments, the treatment fluid system is in an absence of components that are not thermally stable up to the temperature of 400° F., for example, polysaccharide gels, such as guar gum. The polymer loading of the base polymer in the treatment fluid system is greater than 30 pptg (pounds of base polymer per thousand gallons base fluid) (0.36 wt % in the base fluid), alternately less than 300 pptg (3.6 wt %), alternately between 30 pptg (0.36 wt %) and 300 pptg (3.6 wt %), alternately between 45 pptg (0.54 wt %) and 300 pptg (3.6 wt %), and alternately between 60 pptg (0.72 wt %) and 250 pptg (3.0 wt %). As used herein "polymer loading" refers to the total weight of base polymer (in pounds) added to the base fluid as part of the treatment fluid system. In some embodiments, the treatment fluid system reduces the overall polymer loading required in a stimulation fluid by between about 20% and about 75%, preferably by at least about 25%, preferably by at least about 50%, preferably by between about 25% and about 75%, and more preferably by between about 30 and about 50% as compared to presently available commercial fracturing fluids.

The base fluid can be any fluid capable of fracturing a subterranean formation while suspending the fluid composition. Example fluids suitable for use as the base fluid include aqueous fluids, non-aqueous fluids, or combinations thereof. Examples of aqueous fluids include water, a metallic or inorganic salt solution such as brine, or combinations thereof. Examples of non-aqueous fluids include a polar fluid such as an alcohol, a non-polar fluid such as a hydrocarbon, or combinations thereof. Examples of alcohols include methanol and ethanol. Brines can include sodium acetate. In certain embodiments, the base fluid can include water, ethanol, sodium acetate, or combinations thereof.

The fluid composition includes a nano-crosslinker and a base polymer. The fluid composition is a gel or gel-like substance that can be suspended in a fluid and carried into the fractures. The ratio of nano-crosslinker to base polymer in the fluid composition can be in the range of 1:0.1 to 1:1000, alternately can be in the range from 1:1 to 1:100. The crosslinking of the base polymer by the nano-crosslinker is activated by the elevated temperatures in the subterranean reservoir formation. As used herein, the term "elevated" refers to the temperatures in the subterranean reservoir formation being at a temperature greater than the temperature at the surface. Without being bound to a particular theory, it is understood that a small amount, less than 10%, of crosslinking of the base polymer by the nano-crosslinker can occur when the components are initially mixed, but that full crosslinking, greater than 90%, does not occur until the treatment fluid system reaches a temperature between about 120° F. and about 150° F. The temperature at which full crosslinking is achieved varies based on the chemistry of the nano-crosslinker and base polymer. In certain embodiments, the treatment fluid system is a delayed system.

The base polymer is any gelling agent capable of bonding to a crosslinker or nano-crosslinker and remaining thermally stable at temperatures between about 250° F. (121° C.) and about 450° F. (232° C.). The base polymer can be natural or synthetic. The base polymer can include acrylamide-based polymer or polyacrylamide-based polymer. Examples of acrylamide-based polymers include polyacrylamide, partially hydrolyzed polyacrylamide, copolymers of polyacrylamide with other monomers, and combinations of the same.

Without being bound to a particular theory, it is believed that nano-crosslinkers improve rheological properties of a fluid due to their high surface area and high surface forces, such as electrostatic and van der Waals' forces. The nano-crosslinker can be capable of improving the rheological properties of a crosslinked gel at elevated temperatures, that is temperatures between 250° F. (121° C.) and 450° F. (232° C.). The ratio of nanomaterial to crosslinker in the nano-crosslinker is between 1:0.01 by weight and 1:1000 by weight, alternately between 1:0.1 by weight and 1:50 by weight, and alternately between 1:1 and 1:100.

Figure 2:
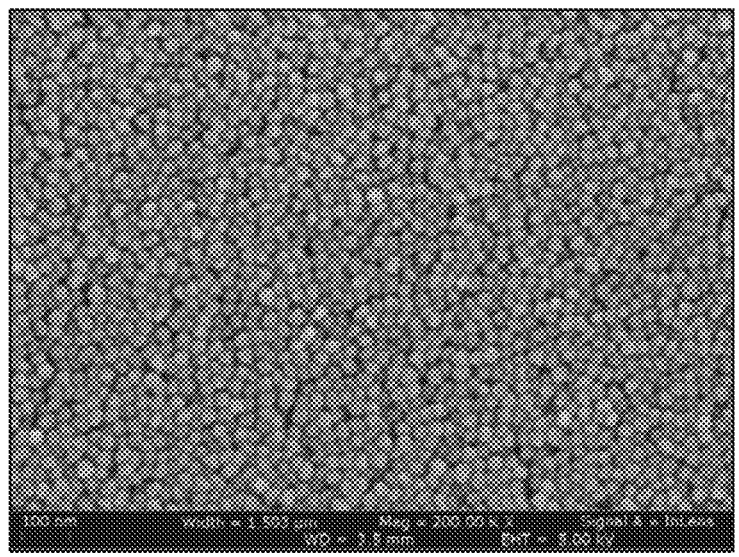
FIG. 2 shows electron micrographs of non-limiting geometric shapes of nanoparticles in accordance with some embodiments. The images were recorded on a Zeiss Ultra 55 field emission scanning electron microscope at 5 kilovolt (kV) accelerating voltage following sputter coating with 5 nanometer (nm) of platinum/palladium (Pt/Pd) alloy. The micrographs were recorded at magnifications of 200,000× for the spherical nanoparticles (upper image) and 125,680× for the rod-shaped nanoparticles (lower image).
Figure 2:
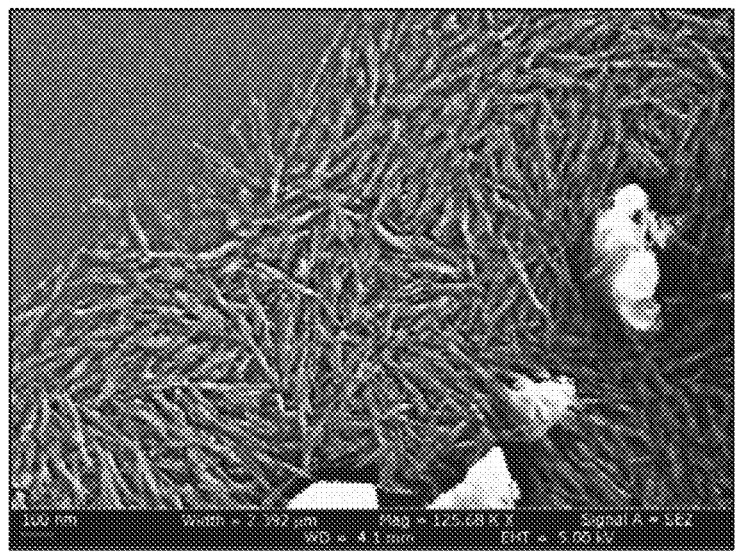

The nanomaterial can be any nanocompound capable of being associated with the crosslinker. The nanomaterial can include inorganic materials, organic materials, or combinations thereof. Examples of inorganic materials suitable for use as the nanomaterial include silica. Examples of organic materials suitable for use as the nanomaterial include cellulose and carbon-based materials. In embodiments, the nanomaterial comprises silica, cellulose, carbon-based materials or combinations thereof. In a preferred embodiment, silica-based nanoparticles have a uniform size distribution. The top image in FIG. 2 provides SEM images of examples of silica-based nanoparticles. The concentration of nanomaterials in the fluid composition can be between 0.1 ppm and 10,000 ppm, alternately between 1 ppm and 1,000 ppm, alternately between 10 ppm and 200 ppm, alternately between 10 ppm and 100 ppm. In at least one embodiment, the concentration of nanomaterials in the fluid composition is 72 ppm.

The crosslinker can be any chemical compound capable of crosslinking the base polymer. In embodiments where the base polymer is an acrylamide-based polymer, the crosslinker is an amine-containing crosslinker. Examples of amine-containing crosslinkers suitable for use as the crosslinker include amines, polyamines, copolymers of amines and other monomers, or combinations thereof. Examples of polyamines suitable for use as the amine-containing crosslinker include polyethylenimine (PEI), spermidine, spermine, polypropylenimine, poly(N-vinylimidazole), polyamines, polyamides, polyimines and polyimides. Polyethylenimine is also known as polyaziridine.

Additives can be included in the treatment fluid system and can be incorporated as part of the fluid composition, can be added to the base fluid (prior to mixing with the fluid composition) or can be added directly to the treatment fluid system. The treatment fluid system can include one or more of the following additives such as a pH control agent, an antioxidant (gel stabilizer), a clay stabilizer, a corrosion inhibitor and a scale inhibitor.

The pH control agent can include, but is not limited to, potassium hydroxide, sodium hydroxide, acetic acid, potassium carbonate, sodium carbonate, potassium bicarbonate, sodium bicarbonate, and hydrochloric acid.

The antioxidant (gel stabilizer) can be any chemical compound capable of stabilizing the resultant polymer formed when the nano-crosslinker gels the base polymer. Examples of chemical compounds suitable for use as the antioxidant (gel stabilizer) can include, but are not limited to, phenols, polyphenols, di-tertbutyl alkyl phenols, hydroquinone, apigenin, resveratrol, ascorbic acid and tocopherol, sodium thiosulfate, sodium thiosulfite, isopropanol, methanol, ethylene glycol, thiourea, and combinations of the same.

Examples of chemical compounds suitable for use as the clay stabilizer include, but are not limited to, sodium chloride, potassium chloride, ammonia chloride, tetramethylammonium chloride (TMAC), other quaternary molecules, and combinations of the same.

Breaker compounds can optionally be included based on the type of application in which the treatment fluid system is to be used. The breaker compound can be any compound capable of decomposing the base polymer, for example when the base polymer is a polyacrylamide gel, and thus reducing the viscosity of the treatment fluid system. The breaker compound can include an emulsion breaker or an encapsulated breaker. The breaker compound can include an oxidizer type compound. Examples of oxidizer type compounds that can be used as the breaker compound include sodium bromate. In some embodiments, the breaker compound can be encapsulated. In at least one embodiment, the breaker compound is an encapsulated sodium bromate. The encapsulation reduces the rate at which the gel breaker acts to reduce the viscosity. In at least one embodiment, the treatment fluid system is used in a conformance control applications and is in the absence of a breaker compound.

The treatment fluid system is injected into the subterranean formation at pressures capable of producing fractures in the subterranean formation.

In at least one embodiment, the nano-crosslinker does not swell in the presence of water. In at least one embodiment, the crosslinking of the nano-crosslinker and the base polymer is accomplished in the absence of a metal, metal cation, or metal complex. In at least one embodiment, the nano-crosslinker is in the absence of a metal, metal cation, or metal complex. In certain embodiments, the nano-crosslinker does not degrade in order to crosslink the base polymer, such that the nano-crosslinker becomes a part of the polymer matrix. In certain embodiments, the crosslinker is not released from the nanomaterial to polymerize the base polymer.

In at least one embodiment, the treatment fluid system includes an aqueous-based fluid, an acrylamide-based polymer, and an amine-containing nano-crosslinker.

In at least one embodiment, the treatment fluid system includes an aqueous-based fluid as the base fluid, an acrylamide-based polymer as the base polymer, an amine-containing nano-crosslinker as the nano-crosslinker, a breaker compound, a pH control agent, and a clay stabilizer.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following example illustrates the viscosity of the treatment fluid systems produced according to the methods and compositions in comparison with conventional well fluids.

Example 1

Silica Nanoparticles Synthesis (60 nm). Silica nanoparticles were synthesized via a modified Stöber approach. Briefly, for a 250 mL synthesis, a 500 mL round bottom flask was charged with 220 mL absolute ethanol, 10.5 mL of deionized water, and 10 mL of 28% ammonium hydroxide and heated to 65° C. in an oil bath and stirred at 300 RPM. Stir rate on the hot plate was increased to 750 RPM and 9.5 mL of 98% tetraethyl orthosilicate was charged into the flask. The rigorous stirring is continued for 30 minutes and returned to 300 RPM for the next 3 hours. To this solution, 2 mL of triethoxysilylbutyraldehyde was added and allowed to proceed overnight. This yields silica nanoparticles around 60 nm as characterized by dynamic light scattering at approximately 1 wt %.

Synthesis of Amine-containing Nano-crosslinker (#1). The silica nanoparticles (60 nm) were coated with a commercially available amine-containing polymer, a 75 kDa polyethylenimine (PEI) resin (Epomin P-1050, 50% in water). To react with the aldehyde surface functionalized silica nanoparticles, 40 mL of 10 wt % solution of the PEI was first pH adjusted from pH 12 to pH 8 with dropwise addition of 37% hydrochloric acid. The silica nanoparticles were concentrated to 2 wt % by removal of some ethanol solvent via rotary evaporation. Around 40 mL (800 mg) of silica nanoparticles were added dropwise to the polymer solution containing 4 g of PEI polymer under vigorous stirring (750 RMP). After addition of the silica nanoparticles, 0.01 mol of sodium borohydride was added for the reductive amination, yielding a solution at 1 wt % silica and 5 wt % polymer. The result was amine-containing nano-crosslinker #1.

General Procedure to Make Treatment Fluid Systems. The base polymer was a commercially available synthetic polymer capable of performing as a gelling agent at elevated temperatures, HE®100 (Chevron Phillips Chemical Company, The Woodlands, Tex.). The base fluid was deionized water. The samples of the treatment fluid system were prepared using a Waring blender. A 60 pounds per thousand gallons (pptg) base gel was prepared by hydrating 7.2 grams of HE®100 dissolved in 1 liter of tap water. Additional additives such as pH control (5 gallons per one thousand gallons (gpt) of 10 wt % potassium carbonate) and antioxidant (2.5 pptg sodium persulfate) were added to the base polymer solution followed by different amounts of the nano-crosslinker according to Table 1. Treatment Fluid System A was produced by mixing the amine-containing nano-crosslinker #1 at a concentration of 5 gpt with a 60 pptg base polymer. Treatment Fluid System B was produced by mixing the amine-containing nano-crosslinker #1 at a concentration of 10 gpt with a 60 pptg base polymer. Treatment Fluid System C was produced by mixing the amine-containing nano-crosslinker #1 at a concentration of 20 gpt with a 60 pptg base polymer. Treatment Fluid System D was produced by mixing the amine-containing nano-crosslinker #1 at a concentration of 50 gpt with a 60 pptg base polymer. The mixed pH for all four treatment fluid systems was around 10.4.

TABLE 1

Details of the treatment fluid systems produced and tested in Example 1.

| Treatment Fluid System | Concentration of Amine-containing Nano-crosslinker #1 (1%) | Base Polymer Concentration |
|---|---|---|
| A | 5 gpt | 60 pptg |
| B | 10 gpt | 60 pptg |
| C | 20 gpt | 60 pptg |
| D | 50 gpt | 60 pptg |

Figure 3:
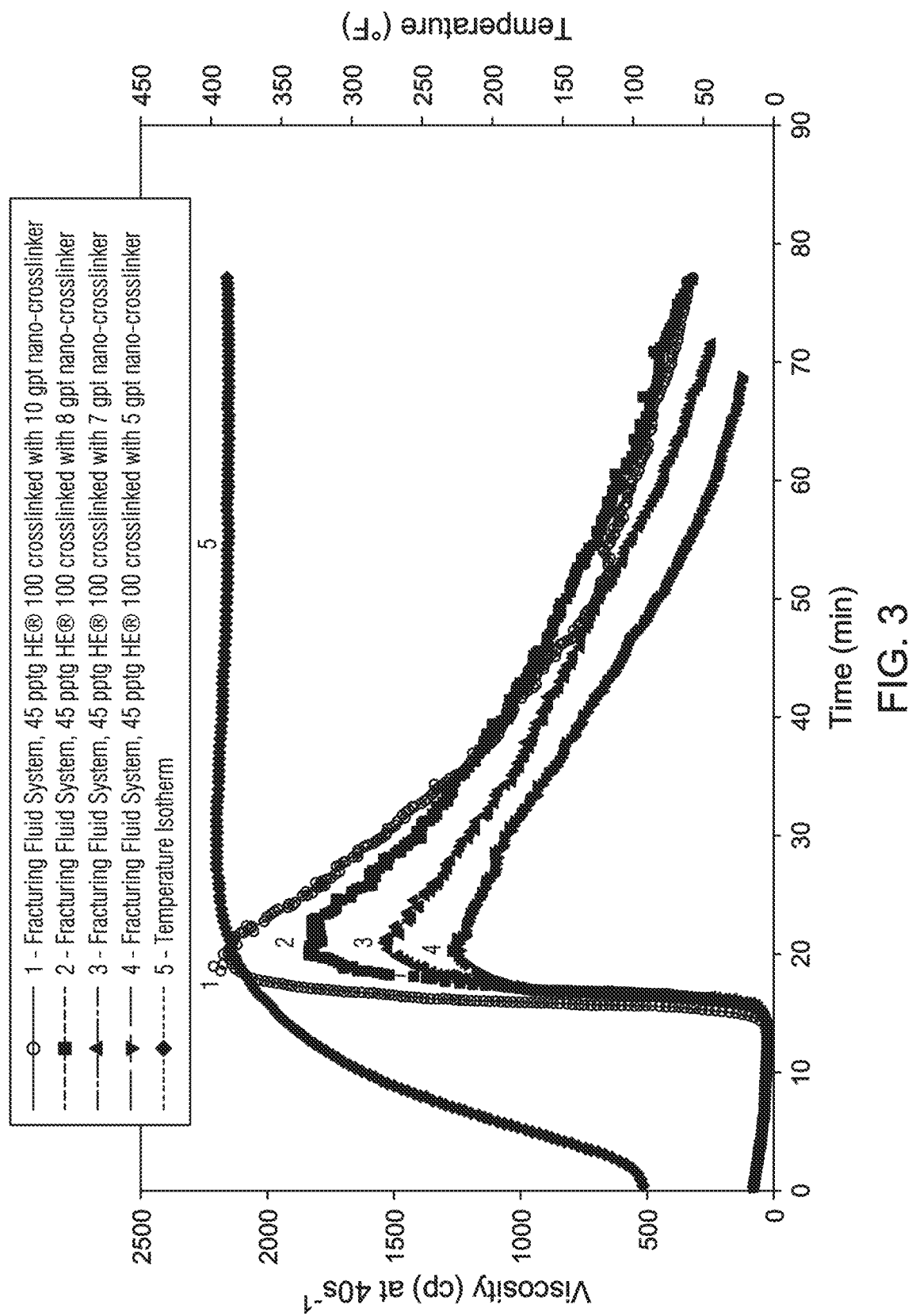
FIG. 3 shows the viscosity curves (in centipoise (cP)) at 100 $s^{-1}$ shear rate and 250° F. for the four treatment fluid systems (A, B, C, and D) according to Example 1.

Physicochemical Measurements and Performance of Treatment Fluid System. To measure the viscosity of each of the treatment fluid systems under reaction conditions designed to simulate those in a high temperature and high pressure subterranean reservoir formation, 52 mL aliquots of each treatment fluid system were injected into a Grace M5600 HPHT rheometer equipped with a B5 bob configuration. Under the reaction conditions, the nano-crosslinker reacts with the base polymer and increases the viscosity of the treatment fluid system. FIG. 3 shows the viscosity curves produced by Treatment Fluid System A, Treatment Fluid System B, Treatment Fluid System C, and Treatment Fluid System D at a shear rate of 100 s$^{-1}$ and a temperature of 250° F. As can be seen, as the concentration of nano-crosslinker increases, the viscosity of the final treatment fluid system increases. Also, the delayed crosslinking time decreases as shown in Table 2.

TABLE 2

Delayed Crosslinking Time

| Treatment Fluid System | Concentration of Amine-containing Nano-crosslinker #1 (1%) | Delayed Crosslinking Time (min) |
|---|---|---|
| A | 5 gpt | 92 |
| B | 10 gpt | 61 |
| C | 20 gpt | 52 |
| D | 50 gpt | 12 |

Leakoff Tests for Treatment Fluid Systems. 100 mL of Treatment Fluid System C was prepared and then was tested in a leakoff test. A filter press (obtained from OFI Testing Equipment, Inc. of Houston, Tex.) was used to perform the leakoff tests described.

Figure 4:
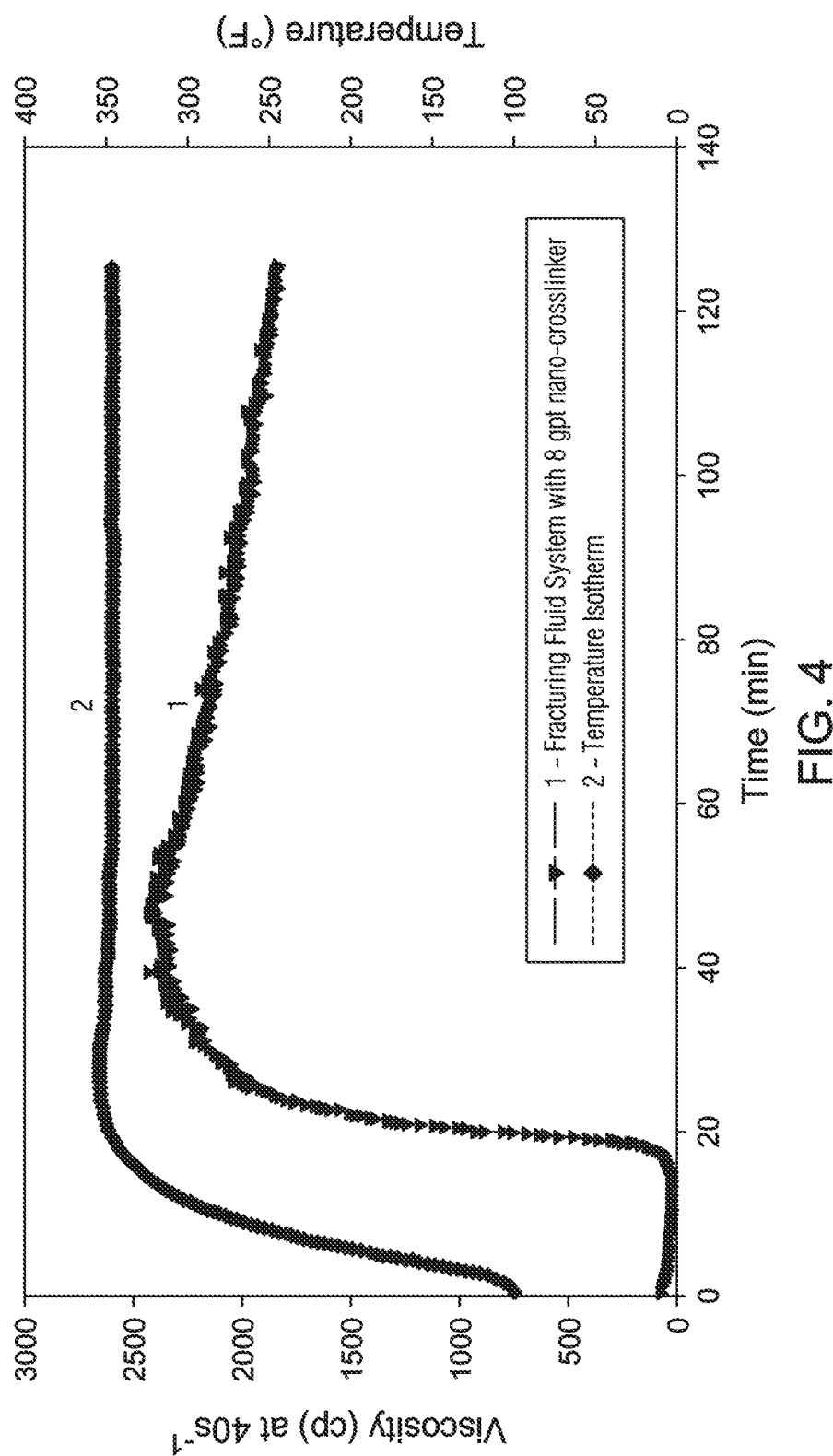
FIG. 4 shows the results from the leakoff test for Treatment Fluid System C.

The filter media used in the experiments was a ceramic disc with a pore throat size of 10 microns. The diameter of the disc was 2.5 inches. Compared to filter paper, selected ceramic discs had a thickness of 0.25 inches, so bridging characteristics of the tested fluids could be analyzed. One hundred milliliters of the prepared Treatment Fluid System C was loaded into the filter press pressure cell, heated for 15 hours to allow sufficient time to form crosslinked gel. Then the weight measurement of the filtrate from the leakoff test was recorded every 0.2 second. The pressure was introduced by $N_2$ gas. FIG. 4 shows cumulative filtrate (g) as a function of time (seconds) for the crosslinked Treatment Fluid System C at 100 psi, 300 psi, 600 psi and 900 psi. A small amount of spurt (less than 8 grams) came out until the filter cake formed and was able to hold the differential pressure at 900 psi.

Example 2

Silica Nanoparticles Synthesis (200 nm). Silica nanoparticles were synthesized via a modified Stöber approach. Briefly, for a 500 mL synthesis, a 500 mL round bottom flask was charged with 205.5 mL methanol, 205.5 mL ethanol, 30 mL of deionized water, and 40 mL of 28% ammonium hydroxide and heated to 50° C. in an oil bath and stirred at 300 RPM. Stir rate on the hot plate was increased to 750 RPM and 19 mL of 98% tetraethyl orthosilicate was charged into the flask. The rigorous stirring is continued for 30 minutes and returned to 300 RPM for the next 3 hours. To this solution, 2 mL of triethoxysilylbutyraldehyde was added and allowed to proceed overnight. This yields silica nanoparticles around 200 nm as characterized by dynamic light scattering at approximately 1 wt %.

Synthesis of Amine-containing Nano-crosslinker (#2). The silica nanoparticles (200 nm) were coated with a commercially available amine-containing polymer, e.g. 75 kDa polyethylenimine (PEI) resin (Epomin P-1050, 50% in water). To react with the aldehyde surface functionalized silica nanoparticles, 40 mL of 10 wt % solution of the PEI was first pH adjusted from pH 12 to pH 8 with dropwise addition of 37% hydrochloric acid. The as-synthesized silica nanoparticles were concentrated to 2 wt % by removal of some solvent via rotary evaporation. Around 40 mL (800 mg) of silica nanoparticles were added dropwise to the polymer solution containing 4 g of PEI polymer under vigorous stirring (750 RMP). After addition of the silica nanoparticles, 0.01 mol of sodium borohydride was added for the reductive amination, yielding a solution at 1 wt % silica and 5 wt % polymer. The result was amine-containing nano-crosslinker #2.

Physicochemical Measurements and Performance of Treatment Fluid System. Treatment Fluid System E was produced by mixing amine-containing nano-crosslinker #2 at a concentration of 20 gpt with a 60 pptg base polymer in the base polymer solution of Example.

TABLE 3

Details the treatment fluid system produced and tested in Example 2.

| Treatment Fluid System | Concentration of Amine-containing Nano-crosslinker #2 (1%) | Base Polymer Concentration |
|---|---|---|
| E | 20 gpt | 60 pptg |

Figure 5:
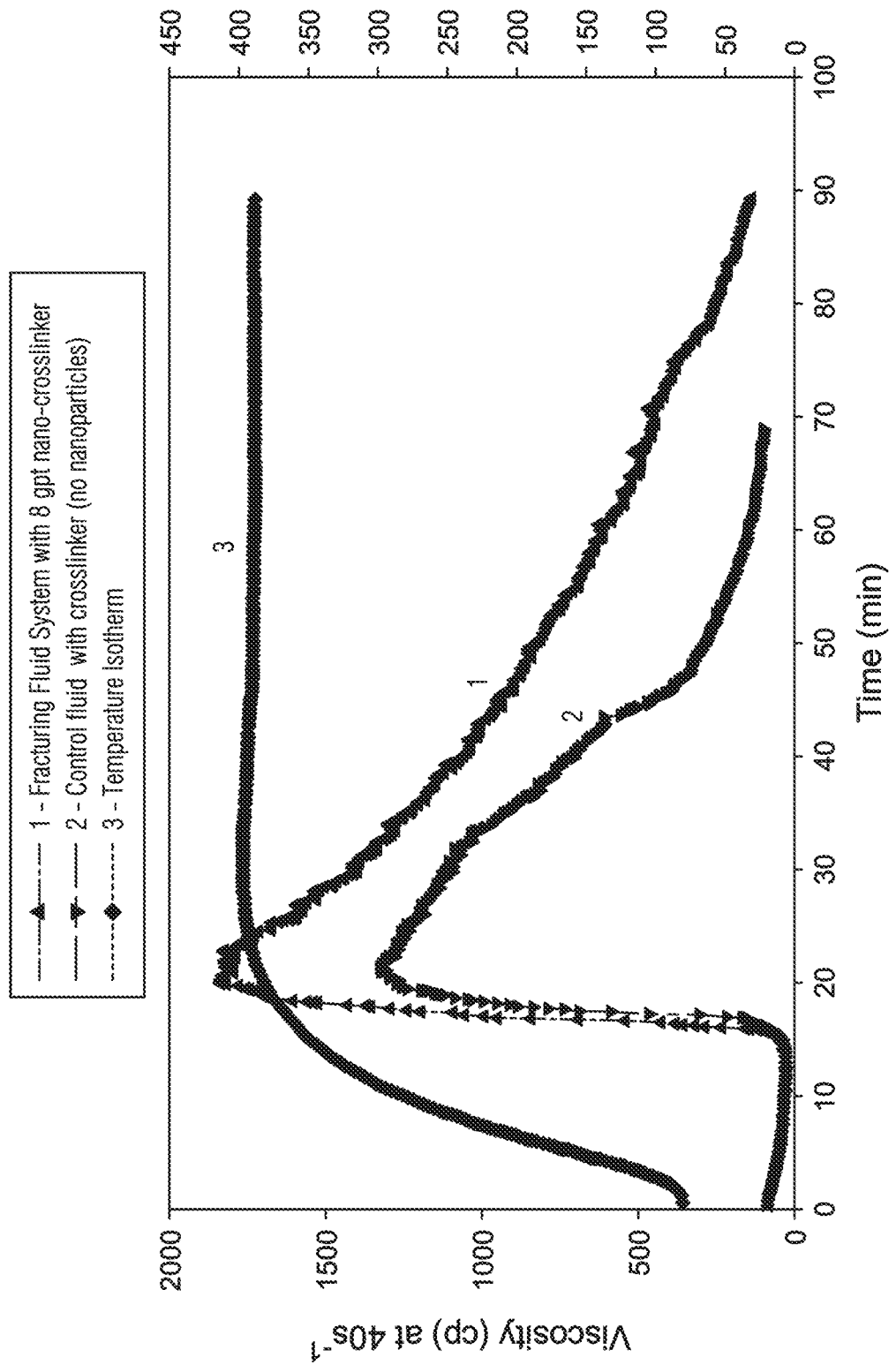
FIG. 5 shows the viscosity curve (in cP) at 100 $s^{-1}$ and 250° F. for treatment fluid system E according to Example 2.

FIG. 5 shows the viscosity curves produced by Treatment Fluid System E at a shear rate of 100 s$^{-1}$ and a temperature of 250° F. The viscosity curve was similar to Treatment Fluid System C of Example 1 (amine-containing nano-crosslinker #1). The viscosity of Treatment Fluid System E reached 1800 cP after a testing time of 12 hours (720 min). The delayed crosslinking time was around 32 min.

Example 3

Synthesis of Amine-containing Nano-crosslinker (#3, 1 wt %). Cellulose nanocrystals (CNCs) were oxidized by sodium periodate in the presence of propanol to avoid cellulose super-oxidation. Briefly, 50 g of CNCs at approximately 10.8 wt % was added to 440 mL of deionized water and homogenized by stirring. To this suspension, 50 mL of isopropanol and 14 g of sodium periodate were added and allowed to stir in the dark for 48 hrs. The reaction was quenched with addition of 50 mL of ethylene glycol. The suspension was washed twice via centrifugation at 5000 RPM and resuspended in deionized water at 5 wt % CNCs. An aqueous solution of Epomin P-1050 polyethylenimine (PEI) at 10 wt % was pH adjusted to pH 8 with 37% hydrochloric acid. To this polymer solution (100 mL), 20 mL of 5 wt % CNCs suspension was added dropwise. After addition of all the CNCs, 0.01 mol of sodium borohydride was added to the suspension and allowed to stir overnight. The PEI-coated-CNCs suspension was washed twice by centrifugation and resuspended at 1 wt % CNCs. The result was amine-containing nano-crosslinker #3.

Physicochemical Measurements and Performance of Treatment Fluid Systems. Treatment Fluid System F was produced by mixing amine-containing nano-crosslinker #3 at a concentration of 40 gpt with a 60 pptg base polymer. Treatment Fluid System G was produced by mixing the amine-containing nano-crosslinker #3 at a concentration of 80 gpt with a 60 pptg base polymer. Treatment Fluid System H was produced by mixing the amine-containing nano-crosslinker #3 at a concentration of 120 gpt with a 60 pptg base polymer in the base polymer solution of Example 1.

TABLE 4

Details of the treatment fluid systems produced and tested in Example 3.

| Treatment Fluid System | Concentration of Amine-containing Nano-crosslinker #3 (1%) | Base Polymer Concentration |
|---|---|---|
| F | 40 gpt | 60 pptg |
| G | 80 gpt | 60 pptg |
| H | 120 gpt | 60 pptg |

Figure 6:
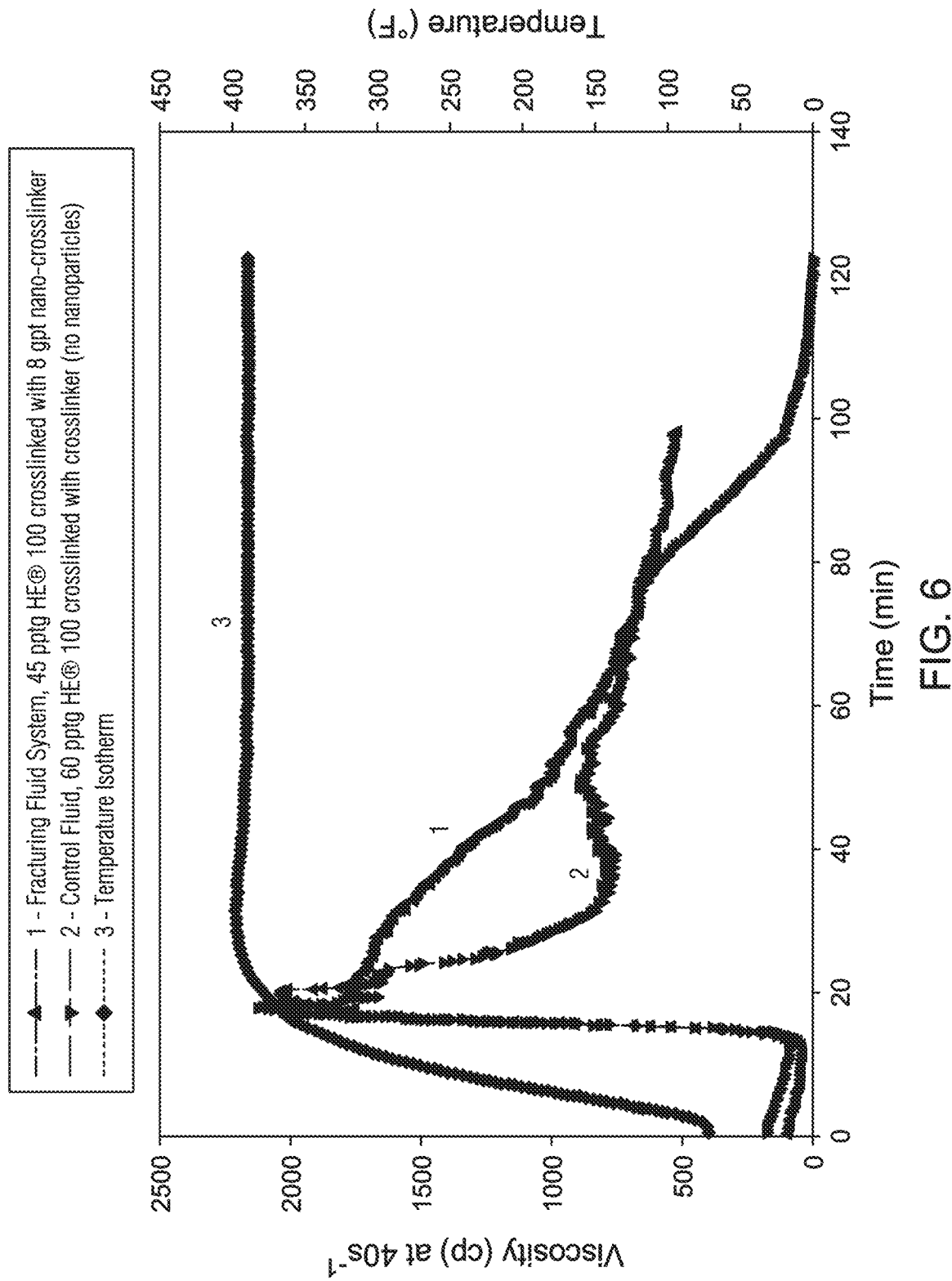
FIG. 6 shows the viscosity curves (in cP) at 100 $s^{-1}$ at 250° F. for the three treatment fluid systems (F, G, and H) according to Example 3.

FIG. 6 shows the viscosity curves produced by Treatment Fluid System F, Treatment Fluid System G, and Treatment Fluid System H at a shear rate of 100 s$^{-1}$ and a temperature of 250° F. As can be seen, as the concentration of nano-crosslinker increases, the viscosity of the final treatment fluid system increases. Also, the delayed crosslinking time decreases with increased concentration of nano-crosslinker.

TABLE 5

Delayed Crosslinking Time

| Treatment Fluid System | Concentration of Amine-containing Nano-crosslinker #3 (1%) | Delayed Crosslinking Time (min) |
|---|---|---|
| F | 40 gpt | 126 |
| G | 80 gpt | 109 |
| H | 120 gpt | 99 |

Example 4

Synthesis of Amine-containing Nano-crosslinker (#4, 1 wt %). Cellulose nanofibrils (CNFs) were oxidized by sodium periodate in the presence of propanol to avoid cellulose super-oxidation. Briefly, 50 g of CNFs at approximately 2.8 wt % was added to 440 mL of deionized water and homogenized by stirring. To this suspension, 50 mL of isopropanol and 6.4 g of sodium periodate were added and allowed to stir in the dark for 48 hrs. The reaction was quenched with addition of 50 mL of ethylene glycol. The suspension was washed twice via centrifugation at 5000 RPM and resuspended in deionized water at 0.5 wt % CNFs. An aqueous solution of Epomin P-1050 polyethylenimine (PEI) at 5 wt % was pH adjusted to pH 8 with 37% hydrochloric acid. To this polymer solution (100 mL), 100 mL of 0.5 wt % CNFs suspension was added dropwise. After addition of all the CNFs, 4 mmol of sodium borohydride was added to the suspension and allowed to stir overnight. The PEI-coated-CNFs suspension was washed twice by centrifugation and re-suspended at 1 wt % CNFs. The result was amine-containing nano-crosslinker #4.

Physicochemical Measurements and Performance of Treatment Fluid Systems. Treatment Fluid System I was produced by mixing amine-containing nano-crosslinker #4 at a concentration of 40 gpt with a 60 pptg base polymer in the base polymer solution of Example 1. Treatment Fluid System J was produced by mixing the amine-containing nano-crosslinker #4 at a concentration of 120 gpt with a 60 pptg base polymer in the base polymer solution of Example 1.

TABLE 6

Details of the treatment fluid systems
produced and tested in Example 4.

| Treatment Fluid System | Concentration of Amine-containing Nano-crosslinker #4 (1%) | Base Polymer Concentration |
|---|---|---|
| I | 40 gpt | 60 pptg |
| J | 120 gpt | 60 pptg |

Figure 7:
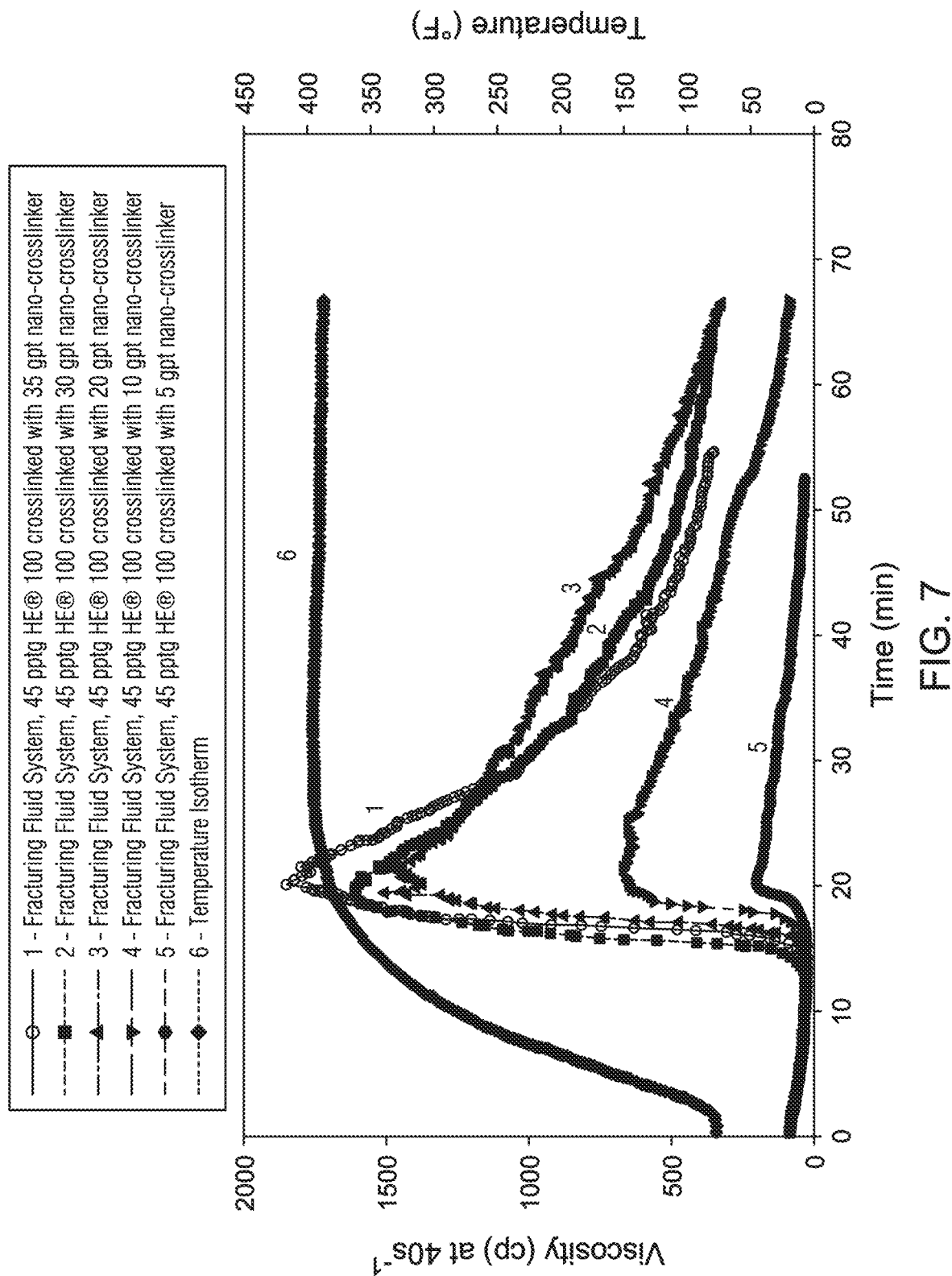
FIG. 7 shows the viscosity curves (in cP) at 100 $s^{-1}$ at 250° F. for the treatment fluid systems (I, J) according to Example 4.

FIG. 7 shows the viscosity curves produced by Treatment Fluid System I, and Treatment Fluid System J at a shear rate of 100 s$^{-1}$ and a temperature of 250° F. As can be seen, as the concentration of nano-crosslinker increases, the viscosity of the final Treatment Fluid System J does exhibit much difference in viscosity compared to Treatment Fluid System I. Also, the delayed crosslinking time were similar as well with Treatment Fluid System I and Treatment Fluid System J having a delayed crosslinking time of about 72 min.

Although the present invention has been described in detail, it should be understood that various changes, substitutions, and alterations can be made hereupon without departing from the principle and scope of the invention. Accordingly, the scope should be determined by the following claims and their appropriate legal equivalents.

The singular forms "a", "an" and "the" include plural references, unless the context clearly dictates otherwise.

"Optional" or "optionally" means that the subsequently described component may or may not be present or the event or circumstances may or may not occur. The description includes instances where the component is present and instances where it is not present, and instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

What is claimed is:

1. A treatment fluid system for constraining fluid flow in a subterranean reservoir formation, the treatment fluid system comprising:
    a fluid composition, the fluid composition comprising:
        a nano-crosslinker, the nano-crosslinker comprising:
            a nanomaterial, and
            a crosslinker, wherein the crosslinker comprises a chemical group selected from the group consisting of carbonyl, sulfhydryl, amine and imine;
                wherein the nano-crosslinker is produced by a method selected from the group consisting of pre-treating the nanomaterial with the crosslinker such that the crosslinker has been functionalized onto the nanomaterial, embedding the crosslinker on the nanoparticle, grafting the crosslinker onto the nanomaterial, and coating the crosslinker on the nanomaterial,
        a base polymer, and
    a base fluid, the base fluid operable to suspend the fluid composition, wherein the base fluid comprises water, wherein the treatment fluid system is operable to reduce permeability of a high permeability zone in the subterranean reservoir formation.

2. The treatment fluid system of claim 1, wherein the base polymer is operable to chemically bond to the crosslinker of the nano-crosslinker to form a network.

3. The treatment fluid system of claim 1, wherein the base polymer comprises an acrylamide-based polymer.

4. The treatment fluid system of claim 1, wherein the polymer loading of the base polymer is between 30 pptg and 300 pptg.

5. The treatment fluid system of claim 1, wherein the nanomaterial comprises a material selected from the group consisting of silica, cellulose, carbon-based materials, and combinations thereof.

6. The treatment fluid system of claim 1, wherein the treatment fluid system is thermally stable up to a temperature of 450° F.

7. The treatment fluid system of claim 1, further comprising a pH control agent selected from the group consisting of potassium hydroxide, sodium hydroxide, acetic acid, potassium carbonate, sodium carbonate, potassium bicarbonate, sodium bicarbonate, hydrochloric acid and combinations thereof.

8. The treatment fluid system of claim 1, further comprising an antioxidant selected from the group consisting of phenols, polyphenols, di-tertbutyl alkyl phenols, hydroquinone, apigenin, resveratrol, ascorbic acid and tocopherol, sodium thiosulfate, sodium thiosulfite, isopropanol, methanol, ethylene glycol, thiourea and combinations thereof.

9. The treatment fluid system of claim 1, further comprising a clay stabilizer selected from the group consisting of sodium chloride, potassium chloride, ammonia chloride, tetramethylammonium chloride (TMAC), other quaternary molecules, and combinations thereof.

10. A method of constraining fluid flow in a subterranean reservoir formation, the method comprising the steps of:
    a. identifying a hydrocarbon producing subterranean reservoir formation; and
    b. introducing an effective amount of the treatment fluid system of claim 1 into the hydrocarbon producing subterranean reservoir formation such that fluid flow is constrained.

11. The method of claim 10, wherein the base polymer is operable to chemically bond to the crosslinker of the nano-crosslinker to form a network.

12. The method of claim 10, wherein the base polymer comprises an acrylamide-based polymer.

13. The method of claim 10, wherein the polymer loading of the base polymer is between 30 pptg and 300 pptg.

14. The method of claim 10, wherein the nanomaterial comprises a material selected from the group consisting of silica, cellulose, carbon-based materials, and combinations thereof.

15. The method of claim 10, wherein the treatment fluid system is thermally stable up to a temperature of 450° F.

16. The method of claim 10, further comprising a pH control agent selected from the group consisting of potassium hydroxide, sodium hydroxide, acetic acid, potassium carbonate, sodium carbonate, potassium bicarbonate, sodium bicarbonate, hydrochloric acid and combinations thereof.

17. The method of claim 10, further comprising an antioxidant selected from the group consisting of phenols, polyphenols, di-tertbutyl alkyl phenols, hydroquinone, apigenin, resveratrol, ascorbic acid and tocopherol, sodium thiosulfate, sodium thiosulfite, isopropanol, methanol, ethylene glycol, thiourea and combinations thereof.

18. The method of claim 10, further comprising a clay stabilizer selected from the group consisting of sodium chloride, potassium chloride, ammonia chloride, tetramethylammonium chloride (TMAC), other quaternary molecules, and combinations thereof.

19. The method of claim 10, wherein the fluid flow is constrained for an extended period of time.

* * * * *